INVENTORS:
George Brian Barrie Chaplin,
Alwyn Roberts Owens and Charles
James Nowell Candy Attorneys for Applicants 3,069,559
CIRCUITS FOR SAMPLING OSCILLOSCOPES
George Brian Barrie Chaplin, Abingdon, Alwyn Roberts Owens, Drayton, near Abingdon, and Charles James Nowell Candy, Wantage, England, assignors to United Kingdom Atomic Energy Authority, London, England
Filed Nov. 28, 1958, Ser. No. 776,968
Claims priority, application Great Britain Dec. 3, 1957
14 Claims. (Cl. 307—88.5)

This invention relates to circuits for sampling oscilloscopes.

Sampling oscilloscopes are used to display very rapid recurrent waveforms, e.g. pulses having rise-times of the order of 1 m$\mu$ sec. In these oscilloscopes the complete waveform is not displayed once per time-base as in more conventional oscilloscopes. Instead, a sample measurement is made at a selected point in the waveform once per recurrence, the selected point being moved incrementally in time along the waveform at each successive recurrence. In this way the shape of the waveform can be traced out as a series of dots on the screen of a cathode-ray tube during the time occupied by a corresponding number of recurring waveforms.

In one known form of sampling oscilloscope a continuous slow linear time-base is applied to the X-plates. At each recurring waveform a fast linear voltage sweep is generated, and at the instant when this sweep voltage crosses the time-base voltage, a very short sampling pulse is generated which is compared with the waveform level at the corresponding point in time, a voltage proportional to this level being applied to the Y-plates. It will be seen that, provided the period between recurring waveforms remains constant, the point sampled moves with constant time increments along the waveform with successive recurrencies. The trace is normally blacked out, but is brightened for a short period following each sample measurement.

The present invention takes advantage of the fast edges and narrow pulses which can be produced by transistors operating in the avalanche mode, to provide a sampling oscilloscope of small physical size, relatively low cost, and low power consumption as compared with existing valve circuits. The avalanche phenomenon is described in a paper by Beale, Stephenson and Wolfendale in the Proceedings of the Institute of Electrical Engineers, Part B, vol. 104, No. 16, pp. 394–402, July 1957.

According to the present invention a time-base circuit comprises a transistor connected to operate in the avalanche mode, means adapted to produce a substantially linear sweep voltage on the application of a trigger pulse thereto, means connecting said sweep-producing means to one control electrode of said transistor, a condenser, means connecting said condenser to the other control electrode of said transistor and means for changing the voltage across said condenser by a fixed increment each time said transistor conducts, whereby the voltage in said condenser may constitute a "stair-case" time-base voltage and a fast-edged pulse may be generated at the collector of said transistor at the leading edge of each step.

Also according to the present invention a circuit arrangement for a sampling oscilloscope comprises a trigger pulse generator including a first transistor connected to operate in the avalanche mode for generating a trigger pulse at a fixed time relative to each successive input pulse to be sampled, a time-base circuit including a second transistor connected to operate in the avalanche mode, means adapted to produce a substantially linear sweep voltage on the application of said trigger pulse thereto, means connecting said sweep-producing means to one control electrode of said second transistor, a first condenser, means connecting said first condenser to the other control electrode of said second transistor and means for changing the voltage across said first condenser by a fixed increment each time said second transistor conducts whereby the voltage on said first condenser constitutes a time-base voltage, means for restoring the voltage on said first condenser to an initial value after a given total change, means for generating a sampling pulse substantially simultaneously with the conduction of said second transistor, a sampling circuit for obtaining an output pulse of amplitude proportional to the instantaneous amplitude of the input pulse during the period of the sampling pulse, an amplifier for said output pulse, a charge storage circuit comprising a second condenser for storing an output charge proportional to said amplified output pulse during the period between input pulses, and means for generating a reset pulse for discharging said second condenser before receiving each output charge.

The sweep-producing means may comprise a third condenser arranged to be charged through a resistor, the voltage across said third condenser being applied to said one electrode. Said one electrode may be the emitter and said other electrode the base. Said first condenser may be connected to the base through an emitter-follower circuit.

Means may be provided for biassing off said second transistor following its conduction until after the end of said trigger pulse. Said biassing means may comprise a first blocking oscillator arranged to be triggered by conduction of said second transistor and thereafter to apply a bias pulse to said second transistor.

Said means for generating a sampling pulse may comprise a third transistor connected to operate in the avalanche mode and triggered by conduction of said second transistor.

Said sampling circuit may comprise a fourth transistor arranged to be normally biassed off and connections for applying said input pulse to its emitter and said sampling pulse to its base.

Said first transistor may be connected in a second blocking oscillator circuit.

The means for incrementally charging said first condenser may comprise a fifth transistor triggered by conduction of said second transistor. Said first blocking oscillator may be connected to trigger said fifth transistor.

The means for restoring the voltage on said first condenser may comprise a connection from said first condenser through a diode and the primary winding of a feedback transformer to the collector of a sixth transistor connected in a third blocking oscillator circuit, said sixth transistor being maintained in low conduction by D.C. feedback connections until said diode conducts whereupon said third blocking oscillator triggers and discharges said first condenser.

Said third blocking oscillator may be arranged to trigger a seventh transistor connected to said first condenser to ensure rapid discharge of said first condenser.

Said charge storage circuit may comprise an eighth transistor connected in an integrating circuit including a fourth condenser connected between base and collector, said eighth transistor being normally biassed off but allowed to conduct during said reset pulse whereby said fourth condenser may be charged by said amplified output pulse, said second condenser being connected between the collector and said reset pulse generating means whereby said second condenser may be discharged during said reset pulse and charged from said fourth condenser following said reset pulse.

Said reset pulse generating means may comprise a fourth blocking oscillator triggered by said first blocking oscillator.

To enable the nature of the invention to be more readily understood, attention is directed by way of example to the accompanying drawings wherein:

FIG. 3 is a circuit diagram of a modification of the circuit of FIG. 1.

Figure 1:
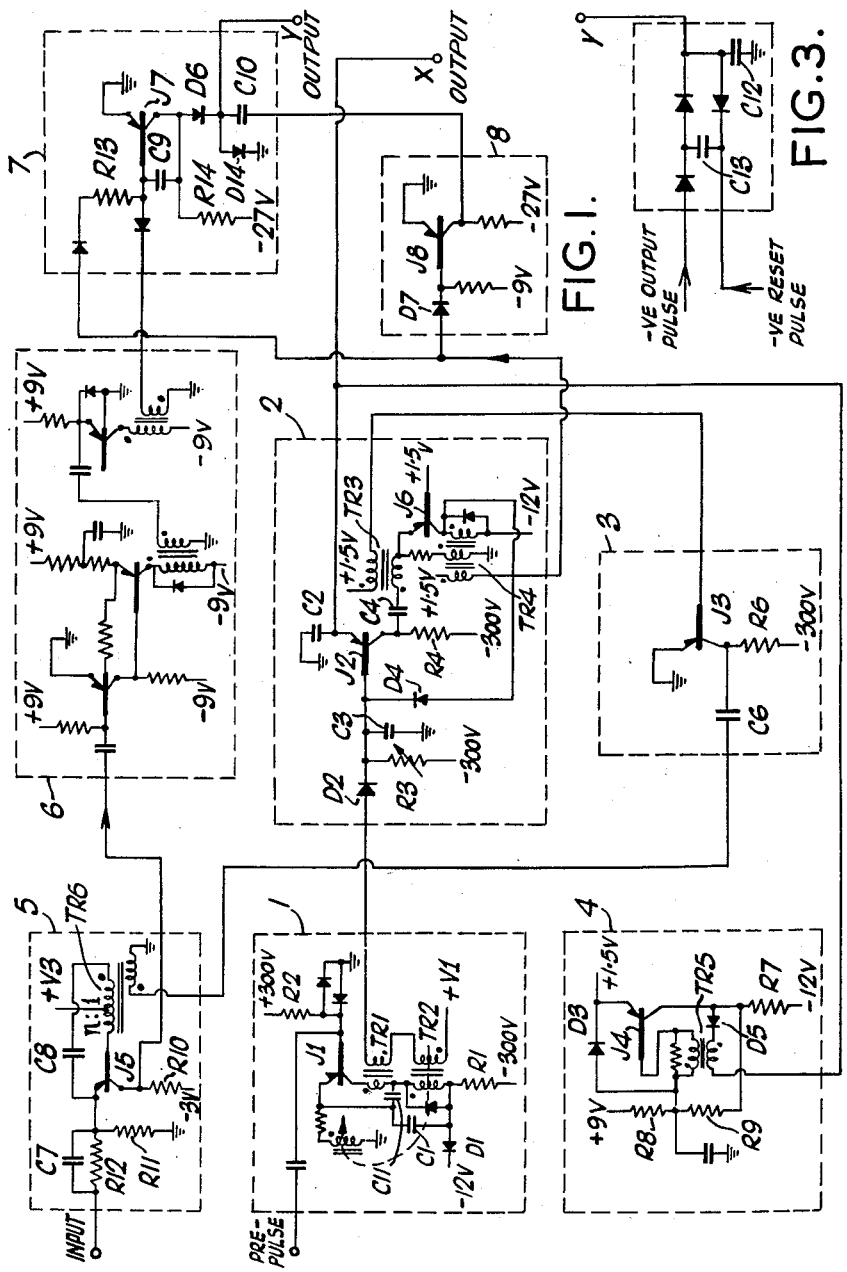
FIG. 1 is a circuit diagram of an embodiment of the invention.

Referring firstly to FIG. 1, a prepulse occurring at a fixed time prior to the commencement of the waveform to be displayed is applied to trigger a blocking oscillator circuit 1 which generates a square-topped switching pulse. (It will be appreciated that a separate prepulse is not essential to the operation of the circuit since, by means of a suitable delay circuit, the recurring waveform can in effect be made to provide its own prepulse.) The prepulse is shown in curve ($a$) in FIG. 2.

The blocking oscillator 1 generates a trigger pulse and comprises a junction transistor J1 (constituting a first transistor) whose collector is connected through the series-connected primary windings of a low-inductance transformer TR1 and a high-inductance transformer TR2 and a resistor R1 to a potential of about −300 v. A bias resistor R2 feeds a fixed current to the transistor base so that the transistor is normally cut off. The valve of R1 is chosen so that with the residual collector current flowing the collector voltage exceeds the avalanche voltage of the transistor, say −30 v. The avalanche phenomenon, as described in the aforementioned Proc. I.E.E. paper, provides a very fast positive-going edge when the oscillator is triggered by a negative pulse applied to its base. The collector voltage rises from −30 v. to 0 v., a catching diode D1 connected as shown causing 12 v. to appear across the two primary windings; a similar voltage appears across the two series-connected secondary output windings. Transformer TR2 has a further secondary winding connected in series with the emitter to provide feedback which holds the transistor in conduction when the avalanche is over. Transformer TR1 operates only during the avalanche rise and is included because TR2 cannot follow this rise owing to leakage inductance. TR2 has however sufficient stray capacitance across it to transmit the pulse to TR1. A condenser C1 connected between the emitter and the junction of D1 and R1 causes a voltage to appear across the transformers even before D1 catches and can be adjusted to provide for an overshoot if required. A condenser C11 connected between the emitter and the junction of the primary windings slows down the rise-time slightly and ensures that the circuit triggers. The output of the blocking oscillator constitutes a trigger pulse for the subsequent circuits and is shown as curve ($b$) of FIG. 2.

The output from oscillator 1 (which constitutes a second blocking oscillator) is applied to a time-base circuit 2 comprising a junction transistor J2 (constituting a second transistor) having its collector connected through a resistor R4 to −300 v., its emitter connected to earth through a condenser C2 (constituting a first condenser), and its base connected to earth through a condenser C3 (constituting a third condenser). The collector of J2 is connected through a condenser C4 and the primary winding of a transformer TR3 to the emitter of a junction transistor J6 whose base potential is fixed at +1.5 v. The transistor J2 is normally cut off by a positive potential V1 applied to its base through the secondary windings of TR1 and TR2 and a diode D2. When a trigger pulse is generated in TR1 and TR2 the diode D2 is cut off, and C3 charges substantially linearly through a resistor R3 connected to −300 v. When the potential across C3 reaches approximately the emitter potential of J2, which is determined by the voltage on C2, J2 conducts in the avalanche mode and C4 discharges into C2 through J2 so that the voltage across C2 is increased by a fixed increment with each switching pulse. Hence C3 has to charge to an incrementally increasing voltage and, since it is charged at a constant rate, takes an incrementally increasing time to do so.

The collector and emitter of J6 are intercoupled by a transformer TR4 to form a blocking oscillator circuit (constituting a first blocking oscillator circuit). When J2 conducts and discharges C4, J6 is triggered on its emitter and produces a longer positive pulse which is applied via a diode D4 to discharge C3 and restore the bias on J2 until after the end of the trigger pulse from the blocking oscillator 1. The voltages across C3 and C2 are shown in curves ($c$) and ($d$) respectively of FIG. 2.

When J2 conducts, a negative output pulse obtained from the secondary winding of TR3 is applied to a pulse generator circuit 3 comprising a junction transistor J3 (constituting a third transistor) having its collector connected through a resistor R6 to −300 v. J3 is normally cut off by a small positive voltage applied to its base via the secondary winding of TR3, but on receipt of a pulse from TR3, J3 conducts in the avalanche mode, and a very fast short positive pulse (about 1 mμ sec. wide) is generated across the primary winding of a transformer TR6 connected to the collector through a condenser C6. This sampling pulse is shown in reversed polarity in curve ($d$) of FIG. 2.

The "staircase" waveform produced across C2 is applied after suitable amplification to the X-plates of a cathode-ray tube to form the time-base. It is also applied to a resetting circuit 4 comprising a junction transistor J4 (constituting a sixth transistor) connected in a blocking oscillator circuit (constituting a third blocking oscillator circuit) comprising a transformer TR5. J4 has its emitter connected to +1.5 v. and its collector connected through a resistor R7 to −12 v. The collector is also connected through a diode D5 and the primary winding of TR5 to the emitter of J2. J4 base is connected through the secondary winding of TR5 and a diode D3 to +1.5 v. Resistors R8 and R9, connected between D3 anode and +9 v. and the junction of R7 and D5 respectively, are chosen to supply currents such that D3 is normally cut off and J4 conducts, its collector voltage being defined by negative feedback action. R7 is chosen so that the collector current is small, and the collector voltage is chosen to be normally more negative than the voltage across C2, so that D5 is normally cut off. The voltage on C2 falls incrementally until D5 conducts, when the circuit acts as a blocking oscillator and discharges C2 almost to earth potential ready to begin another time-base sweep.

Figure 2:
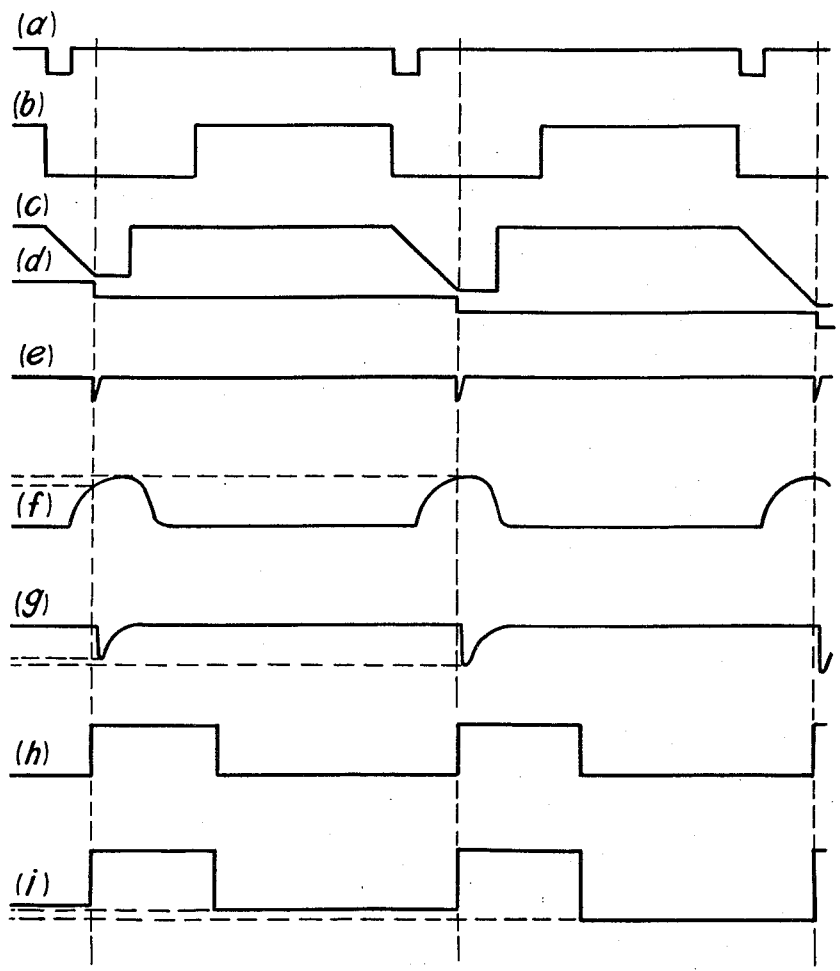
FIG. 2 shows waveforms in the circuit of FIG. 1.

The waveform to be displayed, shown in curve ($f$) of FIG. 2, is applied to a sampling circuit 5 comprising a junction transistor J5 (constituting a fourth transistor) having its collector connected through a resistor R10 to −3 v. The waveform is applied to the emitter through a small condenser C7 (about 1 pf.) to maintain a high input impedance. A sampling pulse of a few volts' amplitude derived from circuit 3 is applied to the base of J5 through the transformer TR6. To reduce the sampling pulse voltage appearing on the emitter due to the base-to-emitter capacity of J5 ($C_{eb}$), a condenser C8 is connected between the emitter and one end of the secondary winding of TR6. J5 is normally cut off by a positive bias voltage +V3 applied via a tapping on the secondary winding but is brought into conduction by the sampling pulse. The tapping point is chosen to give a ratio $n:1$ of the two parts of the secondary winding so that, provided C8 is made equal to $C_{eb}/n$, there is no coupling between base and emitter and none of the sampling pulse voltage appears at the emitter. Resistors R12 and R11 are provided across C7 and between the emitter and earth respectively. R11 is chosen to be small compared with the base-to-emitter resistance of J2 which varies with temperature, and R12 is chosen so that the D.C. attenuation, R12/R11, of the input is equal to the A.C. attenuation, C7/(C8+C_eb). C8 is charged by the input waveform via C7 and is then discharged by the sampling pulse through the base-to-emitter diode. The charge thus injected into the base layer eventually appears as a pulse at the collector. Provided the attenuated input waveform does not exceed the bias level V3, the amplitude of the output pulse at the collector for each sampling pulse is proportional to the instantaneous amplitude of the input waveform. In effect the input waveform varies the bias. The circuit operates satisfactorily with C8 connected to earth rather than to TR6, i.e. without neutralisation. By suitable adjustment of the values of the attenuator components, input waveforms of any amplitude can be accommodated. The sampling circuit 5 and the pulse generator 3 are preferably incorporated in a probe connected by a cable to the remainder of the circuit.

The output pulse from circuit 5 is amplified in an A.C. amplifier 6 which is a transistor amplifier of conventional design and need not be "fast" since it is required to reproduce accurately only the amplitudes of the input pulses applied to it.

The negative output pulses from amplifier 6 are fed to the base of a junction transistor J7 (constituting an eighth transistor) connected in a charge storage circuit 7. J7, which has a condenser C9 (constituting a fourth condenser) connected between base and collector, is normally cut off by a bias current fed through a resistor R13 and a secondary winding on TR4 from a +1.5 v. supply. The collector of J7 is connected to −27 v. through a resistor R14 and also through a diode D6 and a condenser C10 (constituting a second condenser) to the collector of a transistor J8 connected in a reset amplifier circuit 8. J8 is normally cut off by the +1.5 v. supplied via the secondary winding of TR4 and a diode D7, but when J6 conducts D7 is cut off and a positive reset pulse is produced at the collector of J8. This positive pulse cuts off D6 and discharges C10 through D14, whereupon the J7 circuit acts as a Miller integrator for the negative output pulse from the amplifier, since the output pulse is delayed slightly by the amplifier as compared with the leading edge of the pulse from J8.

C9 thus receives a charge proportional to the amplitude of the amplifier output pulse. When the collector potential of J8 falls, D6 conducts and C9 discharges into C10. Moreover because J7 is conducting, C10 also draws through the collector a current equal to $\alpha'$ times the discharge current of C9. Thus the charge on C9 is effectively multiplied by $(1+\alpha')$ when it is transferred to C10. The voltage on C10 is applied either directly or through an amplifier to the Y-plates of the cathode-ray tube. The waveforms at the amplifier output, J8 collector, and across C10 are shown in curves $(g)$, $(h)$ and $(i)$ respectively in FIG. 2.

Because of the "chopper" action of circuit 7, the input waveform circuit is effectively DC-coupled from input to output. Hence a calibrated Y-shift for direct measurement of input amplitudes is available by varying the bias voltage V3 or the voltage to which R11 is returned. Calibrated measurement of pulse-width (X-shift) is available by varying the bias voltage V1, which varies by a corresponding amount the delay between the beginning of the switching pulse from circuit 1 and the generation of the waveform step in circuit 2.

Various modifications may be made to the embodiment described. For example, if a wider sampling pulse can be tolerated, circuit 3 can be dispensed with and the pulse obtained directly from the collector of J2. Again, to reduce circuit delays, the circuit can be rearranged so that the short sampling pulse is generated at the collector of J2 itself, and C2 is incrementally charged by a subsequent circuit triggered from J2. In the sampling circuit 5, both the input and sampling pulses can be applied to the emitter of J5, the base potential being fixed.

The charge storage circuit 7 may be replaced by a diode in series with a condenser, connected so that the latter is charged by the output pulse and discharged by the next reset pulse. However in this case it is necessary to delay the arrival of the output pulse until after the end of the reset pulse. Another alternative is to use the form of diode pump circuit shown in FIG. 3 in which the output pulse charges a first condenser C13 while the reset pulse is discharging a second condenser C12, the charge being transferred by the back edge of the reset pulse from the first to the second condenser.

One advantage of circuits according to the invention is that as all time-base movements are very rapid compared with the duration of the dots, the trace can be kept permanently bright and need not be blacked-out between dots as in known circuits. Another advantage is that the input waveform need not recur at a constant rate; the pulses can be random in time.

Figure 4:
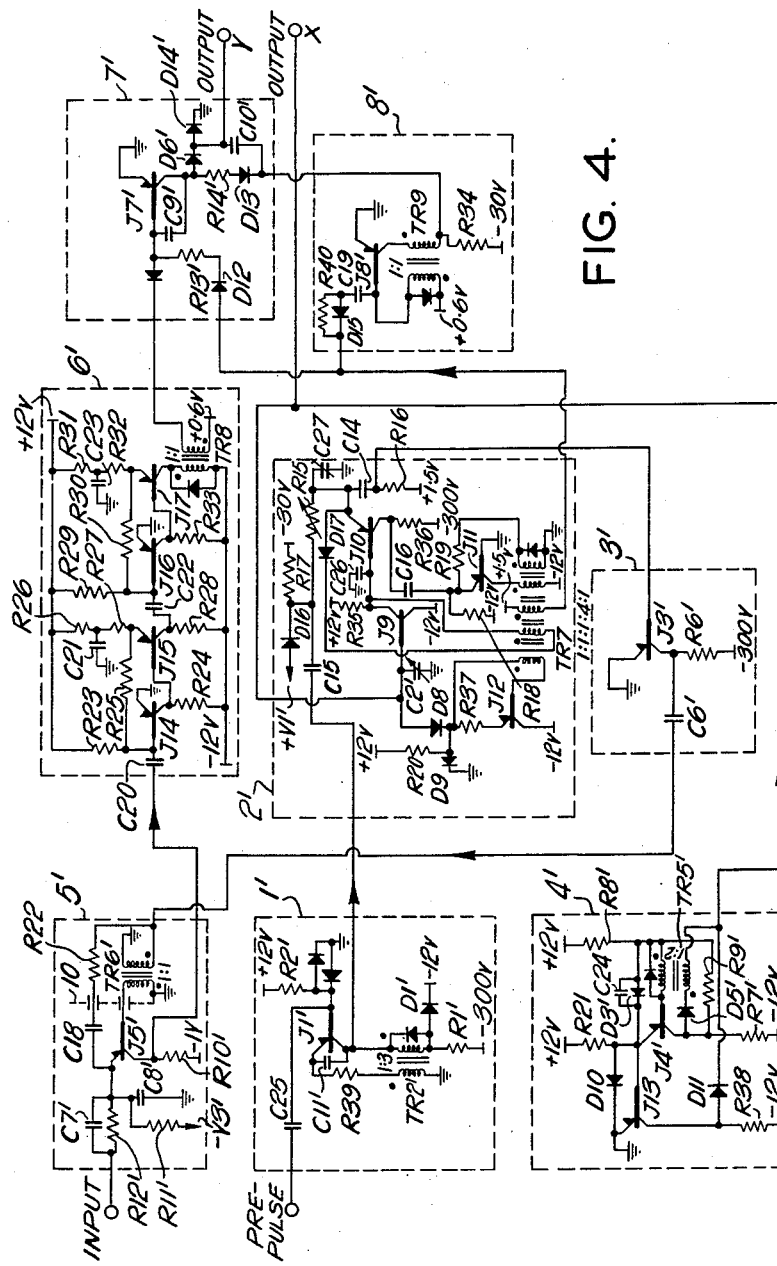
FIG. 4 is a circuit diagram of a preferred embodiment and is a further modification of the circuit of FIG. 1.

In the embodiment of FIG. 4, improved performance has been achieved by reducing the number of functions which any one transistor has to perform, thus allowing greater margins of safety and also more available power in each function.

In the circuit of FIG. 1 the time-base circuit 2 is limited in its operation at low input rates owing to the effect of transistor and other leakage currents flowing into the condenser C2, which cause a gradual drift of spot position and destroy the linearity of the X sweep. These defects can be remedied by increasing the size of C2, e.g. from 0.01 $\mu$f. to 10 $\mu$f., and increasing in the same proportion the charge transferred into it at each step. The latter requirement would require an equivalent increase in condenser C4, e.g. from 10 pf. to 0.01 $\mu$f., and increase correspondingly the recovery time of the circuit. In the circuit of FIG. 4 this last objection is removed by using a separate transistor to charge C2.

Referring to the time-base circuit 2' in FIG. 4, transistor J10 corresponds to transistor J2 in FIG. 1 in that it compares the step waveform across C2' with a fast linear sweep. As compared with J2 however, the roles of base and emitter are interchanged, the step waveform being applied to the base of J10 via an emitter-follower stage comprising transistor J9, and the linear sweep being applied to its emitter. Triggering of J10 occurs when its emitter potential rises above that of its base. The linear sweep at the emitter of J10 is generated by applying a 50 v. step waveform derived from blocking oscillator 1' (as hereinafter described) through a blocking condenser C15 and a variable resistor R15 to a condenser C14 (constituting a third condenser) which is connected between the emitter and +1.5 v. through a low-value resistor R16. The first 10 volts of the resulting exponential rise at the emitter of J10 is reasonably linear and is used as the linear sweep.

A calibrated X-shift, corresponding to the variable voltage V1 in FIG. 1, is introduced by connecting a catching diode D16 between a variable voltage V1' and the junction of C15 and R15, to determine the potential of this junction at the conclusion of the pulse from circuit 1'. A resistor R17 is connected between this junction and −30 v. to keep D16 in conduction. The time-based speed is varied by switching the value of the charging resistor R15, a preset capacitor C27 effectively in parallel in C14 being provided to set up the ranges. A condenser C16 is connected between the collector of J10 and the emitter of a transistor J11 whose base is earthed. When J10 triggers, a large current flows through the path formed by the emitter-base path of J11, C16, the emitter-collector path of J10, C14 and R16. The voltage pulse appearing across R16 forms the trigger pulse for the sampling pulse generator 3'. A condenser C26 is connected between the base of J10 and earth to ensure low A.C. impedance of the base.

To speed up the recovery of J10 emitter at the slower time-base speeds (R15 large) a diode and a resistor R41

(not shown) are connected in series between the emitter and +V1'. Also, to prevent the reverse emitter current of J10 from flowing through R15 and affecting the quiescent emitter potential, a diode (not shown) is connected across R15.

Transistor J11 is connected in a blocking oscillator circuit (constituting a first blocking oscillator circuit) comprising a transformer TR7 which provides feedback to its emitter via a secondary winding, and is normally cut off by the negative bias developed across a low-value resistor R19 connected in series with this secondary winding by current fed to the emitter via a resistor R18.

The circuit for charging C2' comprises a transistor J12 (constituting a fifth transistor) whose emitter is connected to C2' through a resistor R37 and a diode D8. The latter is a silicon diode with very low reverse leakage and is normally held cut off by a small positive current fed from a resistor R20 into a diode D9 connected between the "cathode" of D8 and earth. In this way C2' is isolated from the effect of leakage currents in J12. A secondary winding on TR7 is connected between the base of J12 and the "cathode" of D8, so that when J11 is triggered J12 conducts and extracts a defined charge from C2'. The charge is defined because the output waveform of J11 is accurately determined in amplitude and duration by the circuit constants, and because the charging current is stabilised by the emitter resistor R37. The value of C2' can be switched to vary the number of sampling pulses per time-base sweep.

To ensure that after J10 circuit has recovered it is not re-triggered by the continued application of the pulse from circuit 1', a further secondary winding on TR7 is connected through a diode D17 to apply a negative clamping pulse between the emitter and base of J10. The pulse produced by J11 is made to last beyond the trailing edge of the pulse from circuit 1' and hence J10 cannot be re-triggered after it has recovered.

In FIG. 1 the resetting circuit 4 for recharging condenser C2 was a blocking oscillator circuit. In FIG. 4 condenser C2' is a thousand times greater (about 10 μf. as hereinbefore described) and the recharging current reaches a peak of about 1 amp., so that a more powerful charging circuit is required. As shown in FIG. 4 the resetting circuit 4' comprises in addition to the blocking oscillator circuit comprising transistor J4' a further transistor J13 (constituting a seventh transistor) where base is connected to the emitter of J4' and whose emitter is earthed. In the quiescent state J4' is held slightly conducting by resistors R8', R9' and R7' as described with reference to FIG. 1, and J13 is held cut off by bias current fed from a resistor R21 to a diode D10 connected between its base and emitter. As hereinbefore described the circuit remains quiescent until the potential on condenser C2' falls below that of the collector of J4', whereupon D5' conducts and J4' is triggered as a blocking oscillator. The resulting current flowing at the emitter of J4' overcomes the bias current which is holding off J13 so that the latter conducts and the main recharging current is supplied to C2' through a diode D11 connected between C2' and the collector of J13. The action stops when the collector of J4' finally bottoms; the voltage on C2' is then insufficient to maintain the blocking oscillator action of J4' and the circuit returns to the quiescent state. Diodes D5' and D11 are of the silicon type to prevent leakage currents in J4' and J13 flowing into C2' in the quiescent state.

The sample pulse generator circuit 3' is unchanged and is combined in a probe with the sampling circuit 5'. The latter is modified as compared with circuit 5 in that the Y shift voltage V3' is applied to the lower end of R11' and not to the base of transistor J5'. In operation the Y shift control is used to bring the portion of the waveform under observation to the centre of the display, so that the emitter is always at the same D.C. level and acts as a virtual earth. In this way the operating voltages on J5' are held constant and independent of signal level. Other modifications include using a non-centre-tapped secondary winding on TR6' and returning C8' to earth. A neutralising network comprising C18 and R22 in series is connected between the emitter of J5' and the input to the primary winding of TR6' to eliminate a dip in frequency response caused by the resonance of the emitter-base capacitance of J5' with the inductance of the secondary winding of TR6'. The two circuits 5' and 3' are separated in the probe by an electrostatic screen 10.

The A.C. amplifier 6' uses conventional transistor feedback pairs J14—J15 and J16—J17 and produces a negative output pulse from a transformer TR8 connected in collector circuit of J17.

The charge storage circuit 7' is similar to the circuit 7 of FIG. 1 in that J7' is normally cut off by bias current fed from a resistor R13', a diode D12 and a secondary winding on TR7 from a +1.5 v. supply. Instead of being connected directly to a negative supply, R14' is now returned through a diode D13 to the lower side of C10'. Diode D13 prevents the positive reset pulse from circuit 8' reaching the collector of J7'.

The reset amplifier circuit 8' now uses a blocking oscillator (constituting an eighth blocking oscillator) to generate the positive reset pulse instead of the simple amplifier of circuit 8 in FIG. 1. This blocking oscillator circuit comprises a transistor J8' having a feedback loop comprising transformer TR9. J8' is normally cut off by the +0.6 v. to which the secondary winding of TR9 is returned, and is triggered on its base through a condenser C19 and diode D15 connected to the same winding on TR7 which is used to control the conduction of J7'.

The blocking oscillator circuit 1' is considerably simplified as compared with the circuit 1 of FIG. 1. Because the circuit 2' now requires a positive-going instead of a negative-going edge to produce the linear sweep, the output of circuit 1' is now taken directly from the collector of transistor J1' and the low leakage-inductance transformer TR1 is no longer required.

Since the oscilloscope described is essentially a pulse data processing system, it is possible to display several waveforms simultaneously by gating the input pulses from several probes. For example a binary scaling stage can be added which is operated by the pulses from circuit 1' and gates the pulses from the emitter of J10 in circuit 2' to alternate probes, each containing a circuit 3' and 5', with each succeeding input pulse, the resulting outputs being mixed at the input to amplifier 6'. The final display then consists of dots which are laid on each trace alternately. In this way the two waveforms are traced out during each X sweep (each containing half the number of dots) and the problems of flicker at low frequencies are greatly reduced.

In this specification the term "control electrode" means the base or emitter electrode of a transistor.

Suitable component values in the embodiment of FIG. 4 are as follows (resistor values in ohms):

| | | | |
|---|---|---|---|
| R1' | 270K | R21 | 2.2K |
| R2' | 5.6K | R22 | 220 |
| R6' | 270K | R23 | 220K |
| R7' | 1.5K | R24 | 33K |
| R8' | 4.7K | R25 | 10K |
| R9' | 2.7K | R26 | 10K |
| R10' | 10K | R27 | 100 |
| R11' | 33K | R28 | 5.6K |
| R12' | 330K | R29 | 6.8K |
| R13' | 330 | R30 | 10K |
| R14' | 10K | R31 | 3.9K |
| R15 | 2.2K–220K | R32 | 100 |
| R16 | 47 | R33 | 1K |
| R17 | 330K | R34 | 330 |
| R18 | 10K | R35 | 10K |
| R19 | 56 | R36 | 270K |
| R20 | 10K | R37 | 33 |

| | | | | |
|---|---|---|---|---|
| R38 | 1K | R40 | | 10K |
| R39 | 100 | R41 (not shown) | | 22K |
| C2' | μf 8–24 | C18 | pf | 3.3 |
| C6 | pf 3.3 | C19 | pf | 3300 |
| C7' | pf 1 | C20 | μf | 0.01 |
| C8' | pf 10 | C21 | μf | 1 |
| C9' | pf 1000 | C22 | μf | 1 |
| C10' | pf 3300 | C23 | μf | 1 |
| C11' | pf 470 | C24 | μf | 0.04 |
| C14 | pf 22 | C25 | pf | 47 |
| C15 | pf 1000 | C26 | μf | 0.01 |
| C16 | pf 1000 | C27 | pfs | 20–120 |

J1', J3', J10. Mullard OC 44 or Ediswan XA 102 (selected).

J4', J7', J8'. Mullard OC 72.

15'. Philco SB 100.

J13. Mullard OC 30.

Remaining transistors Mullard OC 44 or Ediswan XA 102 (unselected).

We claim:

1. A time-base circuit including a transistor, said transistor having an emitter electrode, a base electrode and a collector electrode, said emitter and base electrodes constituting control electrodes and said transistor being connected to operate in the avalanche mode, means adapted to produce a substantially linear sweep voltage on the application of a trigger pulse to said means, means connecting said sweep-producing means to one control electrode of said transistor, a condenser, means connecting said condenser to the other control electrode of said transistor and means for changing the voltage across said condenser in a given direction of polarity by successively equal increments each time said transistor conducts, whereby the voltage on said condenser may constitute a "stair-case" time-base voltage and a fast-edged pulse may be generated at the collector of said transistor at the leading edge of each step.

2. A circuit arrangement for a sampling oscilloscope comprising a trigger pulse generator including a first transistor connected to operate in the avalanche mode for generating a trigger pulse at a fixed time relative to each successive input pulse to be sampled, a time-base circuit including a second transistor connected to operate in the avalanche mode, means adapted to produce a substantially linear sweep voltage on the application of said trigger pulse to said means, means connecting said sweep-producing means to one control electrode of said second transistor, a first condenser, means connecting said first condenser to the other control electrode of said second transistor and means for changing the voltage across said first condenser by a fixed increment each time said second transistor conducts whereby the voltage on said first condenser constitutes a time-base voltage, means for restoring the voltage on said first condenser to an initial value after a given total change, means for generating a sampling pulse substantially simultaneously with the conduction of said second transistor, a sampling circuit for obtaining an output pulse of amplitude proportional to the instantaneous amplitude of the input pulse during the period of the sampling pulse, an amplifier for said output pulse, a charge storage circuit comprising a second condenser for storing an output charge proportional to said amplified output pulse during the period between input pulses, and means for generating a reset pulse for discharging said second condenser before receiving each output charge.

3. An arrangement as claimed in claim 2 wherein said sweep-producing means comprises a third condenser arranged to be charged through a resistor, the voltage across said third condenser being applied to said one electrode.

4. An arrangement as claimed in claim 3 wherein said one electrode is the emitter and said other electrode is the base.

5. An arrangement as claimed in claim 4 wherein said first condenser is connected to the base through an emitter-follower circuit.

6. An arrangement as claimed in claim 5 comprising means for biasing off said second transistor following its conduction until after the end of said trigger pulse.

7. An arrangement as claimed in claim 6 wherein said biassing means comprises a first blocking oscillator circuit arranged to be triggered by conduction of said second transistor, said first blocking oscillator including a winding connected between base and emitter of said second transistor.

8. An arrangement as claimed in claim 2 wherein said means for generating a sampling pulse comprise a third transistor connected to operate in the avalanche mode and triggered by the conduction of said second transistor.

9. An arrangement as claimed in claim 2 wherein said sampling circuit comprises a fourth transistor arranged to be normally biassed off and connections for applying said input pulse to its emitter and said sampling pulse to its base.

10. An arrangement as claimed in claim 2 wherein the means for restoring the voltage on said first condenser comprise a connection from said first condenser through a diode and the primary winding of a feedback transformer to the collector of a sixth transistor connected in a third blocking oscillator circuit including said transformer, said sixth transistor being maintained in low conduction by D.C. feedback connections until said diode conducts whereupon said third blocking oscillator circuit triggers and discharges said first condenser.

11. An arrangement as claimed in claim 7 wherein said reset pulse generating means comprises a fourth blocking oscillator triggered by said first blocking oscillator.

12. A time-base circuit including a transistor, said transistor having an emitter electrode, a base electrode and a collector electrode, said emitter and base electrodes constituting control electrodes and said transistor being connected in a trigger circuit, means adapted to produce a substantially linear sweep voltage on the application of a trigger pulse to said means, means connecting said sweep-producing means to one control electrode of said transistor, a condenser, means connecting said condenser to the other control electrode of said transistor and means for changing the voltage across said condenser in a given direction of polarity by successively equal increments, each time said transistor conducts, whereby the voltage on said condenser may constitute a "stair-case" time-base voltage and a pulse may be generated at the collector of said transistor at the leading edge of each step.

13. A circuit arrangement for a sampling oscilloscope comprising a trigger pulse generator including a first transistor for generating a trigger pulse at a fixed time relative to each successive input pulse to be sampled, a time-base circuit including a second transistor, said second transistor having an emitter electrode, a base electrode and a collector electrode, said emitter and base electrodes constituting control electrodes and said second transistor being connected in a trigger circuit, means adapted to produce a substantially linear sweep voltage on the application of said trigger pulse to said means, means connecting said sweep-producing means to one control electrode of said second transistor, a first condenser, means connecting said first condenser to the other control electrode of said second transistor and means for changing the voltage across said first condenser by a fixed increment each time said second transistor conducts whereby the voltage on said first condenser constitutes a time-base voltage, means for restoring the voltage on said first condenser to an initial value after a given total change, means for generating a sampling pulse substantially simultaneously with the conduction of said second transistor, a sampling circuit for obtaining an output pulse of amplitude proportional to the instantaneous amplitude of the input pulse during the period of the sampling pulse, an amplifier for said output pulse, a charge storage circuit comprising a second condenser for storing an output charge proportional to said amplifier output pulse during the period between input pulses, and means for generating a reset pulse for discharging said second condenser before receiving each output charge.

14. An arrangement as claimed in claim 2 wherein said charge storage circuit comprises an eighth transistor connected in an integrating circuit including a fourth condenser connected between base and collector, a connection between said base and the output of said amplifier, a connection to said base for biassing off said eighth transistor except during said reset pulses whereby said fourth condenser may be charged by said amplified output pulse, first and second diodes connected in series between the collector of said eighth transistor and a fixed potential, said second condenser being connected between the junction of said diodes and said reset pulse generating means being adapted to produce a positive reset pulse, whereby said second condenser may be discharged through said second diode during said reset pulse and charged from said fourth condenser through said first diode following said reset pulse.

References Cited in the file of this patent

UNITED STATES PATENTS

| | | |
|---|---|---|
| 2,500,536 | Goldberg | Mar. 14, 1950 |
| 2,843,743 | Hamilton | July 15, 1958 |
| 2,871,378 | Lohman | Jan. 27, 1959 |